United States Patent [19]

Wintels et al.

[11] 4,032,115

[45] June 28, 1977

[54] DEVICE FOR MIXING COMPONENTS WHICH FORM A PLASTIC

[75] Inventors: August Wintels, La Val; Christopher J. M. Ives, Beaconsfield, both of Canada

[73] Assignee: Exxon Research and Engineering Company, Linden, N.J.

[22] Filed: June 21, 1976

[21] Appl. No.: 697,928

[52] U.S. Cl. .................................. 259/7; 23/252 R
[51] Int. Cl.² ...................... B01F 7/00; B01F 7/24
[58] Field of Search .................... 259/6, 7, 8, 9, 10, 259/21, 22, 23, 24, 25, 26, 43, 40, 41, 42, 44, 191, 192, 193; 23/252 R; 425/206, 207, 208, 209

[56] References Cited

UNITED STATES PATENTS

| | | | |
|---|---|---|---|
| 3,111,389 | 11/1963 | Hansen | 23/252 R |
| 3,393,052 | 7/1968 | Axelsson | 23/252 R |
| 3,559,955 | 2/1971 | Wydeveld | 259/8 |
| 3,902,850 | 9/1975 | Lehnert | 259/7 |
| 3,938,783 | 2/1976 | Porter | 259/7 |

Primary Examiner—Robert W. Jenkins

[57] ABSTRACT

A device for blending together components which are to form a given plastic material. The device has a stationary housing formed with inlet ports to receive the components which are to be blended together. Connected with the stationary housing is a removable cartridge having ports which receive the components from the inlet ports of the stationary housing. The ports of the stationary housing communicate with a mixing chamber of the cartridge in which there is a rotary impeller for blending the components together, the removable cartridge terminates at its front end in a nozzle through which the blended components are discharged. The impeller is driven by a shaft which extends rearwardly through and beyond the cartridge housing to connect with a drive carried by the stationary housing, the cartridge having a rear bearing portion situated in a bore of the stationary housing. This cartridge is removably connected with the stationary housing, so it can be quickly and easily removed as a unit from the stationary housing for cleaning or replacement to thereby increase overall machine productivity.

16 Claims, 7 Drawing Figures

DEVICE FOR MIXING COMPONENTS WHICH FORM A PLASTIC

BACKGROUND OF THE INVENTION

The present invention relates to devices for mixing together various components which are combined to form a given plastic. The device of the invention is particularly suitable for mixing the various components of a phenolic foam material which is ejected onto a moving platen for subsequent foaming into material such as thermal insulation board.

Devices of this type are subject to stringent operating requirements. Thus, when dealing with materials of the above type fast production rates are essential. Such product rates typically involve a "creaming" time of the mixed chemical components which is on the order of 2–3 seconds, with subsequent blowing being completed in the following 20–30 seconds. Because of this type of fast production rate, the device is subjected to severe operating requirements particularly with respect to prevention of setting and build-up of the materials which are mixed by the device as well as with respect to failure of seals and maintenance of essential cooling and lubrication of moving parts.

It has not yet been possible with conventional devices to fulfill these requirements in a fully adequate manner. The conventional devices suffer from undesirably large down times due to bearing failures and plugging during which various parts thereof must be disassembled, cleaned, and reassembled or during which certain parts must be replaced. Thus, the conventional mixing devices suffer not only from the drawback of frequent and undesirably long down times.

SUMMARY OF THE INVENTION

It is accordingly a primary object of the present invention to provide a device which will avoid the above drawbacks of conventional mixing devices.

In particular, it is an object of the present invention to provide a device which is capable of mixing together components which will form a plastic, such as a phenolic foam plastic, in such a way that fast production rates on the order set forth above can be achieved while at the same time assuring a minimum machine down time and also assuring a minimum time required for reassembling the device up for operation.

In particular, it is an object of the present invention to provide a device of the above type according to which all of the components which are subject to severe operating conditions form part of a removable cartridge which can be quickly removed and replaced by a new cartridge, so that while operations go forward with the new cartridge maintenance can be carried out on the removed cartridge, thus achieving in this way a minimum down time as well as a minimum time for setting the device up for operation.

It is also an object of the present invention to provide in a removable cartridge of the above type the capability of operating in such a way that there will be a minimum build-up of mixed chemical materials which fail to flow through and out of the cartridge.

Also it is an object of the present invention to provide for a device of the above type highly effective seals which will be subject to minimum possiblity of failure so that the duration of operation of the device will be extended as compared to conventional devices.

Furthermore, it is an object of the present invention to provide a device of the above type with an improved bearing lubrication and seal system which aids in the cooling of such bearings and the effectiveness of the shaft seal.

It is also an object of the present invention to provide a device of the above type according to which it becomes possible to feed the components which are to be mixed together continuously to the device with the device either being in a dispense mode where the fed components are blended together or in a recirculating mode where the fed components are recirculated back to the source from which they are derived.

According to the invention, the device for mixing components together to form a plastic therefrom includes a stationary housing means having a front end face and formed with an axial bore extending rearwardly along the interior of the stationary housing means from the front end face thereof. This stationary housing means has an outer surface and is formed outwardly of the axial bore with a plurality of inlet ports, each extending from the outer surface of the stationary housing means to the front end face thereof for respectively receiving components to be blended together and for delivering the components to the front end face of the stationary housing means. A cartridge is removably connected to the stationary housing means. This cartridge has an elongated tubular cartridge housing means having a rear portion extending into the axial bore of the stationary housing means, an elongated front portion extending forwardly from the stationary housing means, and at a junction between the rear end front portions an annular rearwardly directed surface fluid-tightly engaging the valve seal stop plate forming the front end face of the stationary housing means. The front portion of the cartridge housing means has a hollow interior defining a mixing chamber, and the cartridge housing means is formed with a plurality of component-transmitting ports respectively communicating with the inlet ports of the stationary housing means at the front end valve seal stop plate thereof and each extending from the rearwardly directed surface of the cartridge housing means to the mixing chamber. Thus, through these component-transmitting ports the components which are to be blended together are transmitted from the inlet ports of the stationary housing means to the mixing chamber of the cartridge housing means. A connection means releasably connects the housing means to the stationary housing means with the rearwardly directed surface of the cartridge housing means fluid-tightly engaging the front end face of the stationary housing means. A rotary impeller means is situated in the mixing chamber of the cartridge housing means for agitating and blending together the components received in the mixing chamber from the component-transmitting ports of the cartridge housing means. A rotary drive shaft means is fixed to the impeller means and extends therefrom rearwardly along and through the rear portion of the cartridge housing means and beyond the latter along the axial bore of the stationary housing means. A drive means is carried by a rear portion of the stationary housing means and is releasably connected with the drive shaft means at a portion thereof which extends rearwardly beyond the cartridge housing means for driving the drive shaft when the cartridge housing means is connected by the connecting means with the stationary housing means. This rotary impeller means has a rear end surface surrounding the drive shaft means and situated rearwardly of front outlet ends of the component-transmitting ports of the cartridge housing means. A sealing means is carried by the cartridge housing means and has a fluid-tight sealing engagement with the rear end surface of the rotary impeller means. A dispensing nozzle means is carried by the cartridge housing means at a front end of the front portion thereof for dispensing the blended components formed in the mixing chamber. Thus, the cartridge housing means may be removed from the stationary housing means together with the drive shaft means, the impeller means connected thereto, the dispensing nozzle means, and the sealing means, leaving only the stationary housing means and the drive means on the remainder of the thermal insulation board machine (not shown) with which the present invention is intended for use.

BRIEF DESCRIPTION OF DRAWINGS

The invention is illustrated by way of example in the accompanying drawings which form part of this application and in which.

DESCRIPTION OF THE PREFERRED EMBODIMENT

Figure 1:
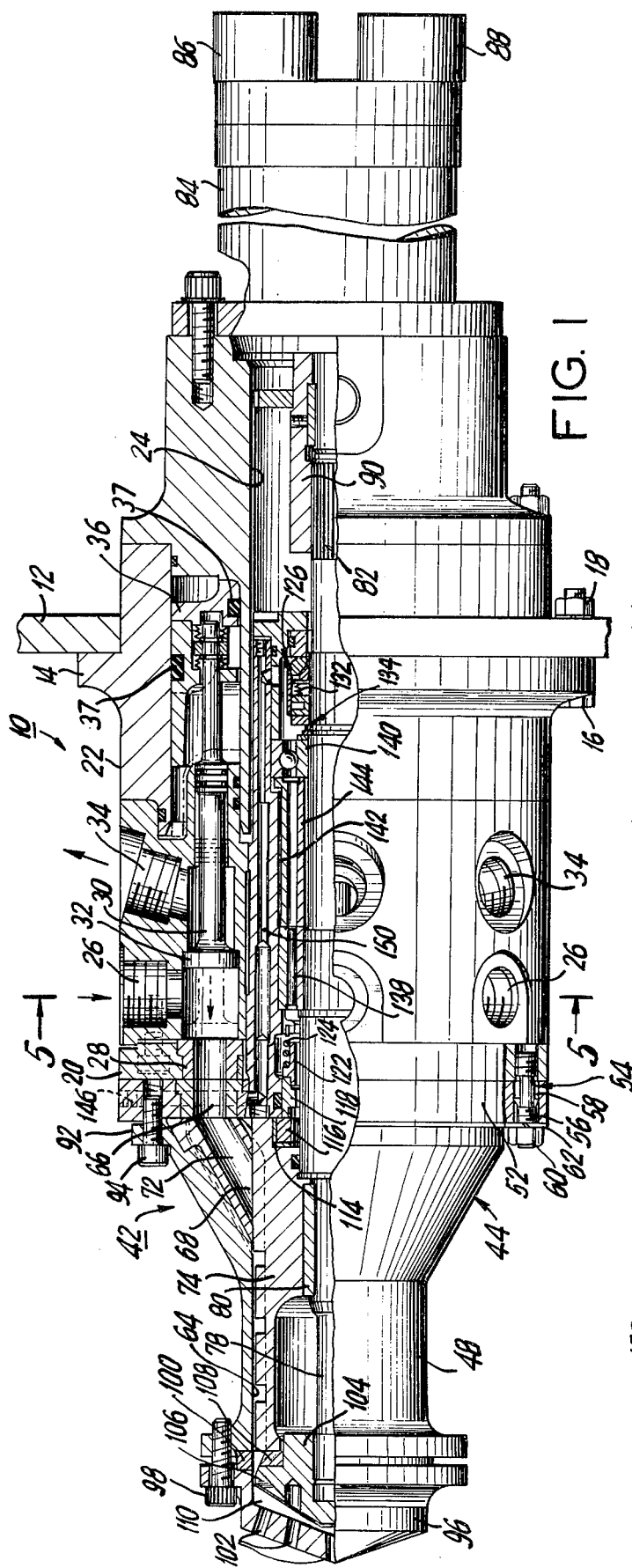
FIG. 1 is a partly sectional side elevation of one possible embodiment of a device according to the invention.
Figure 2:
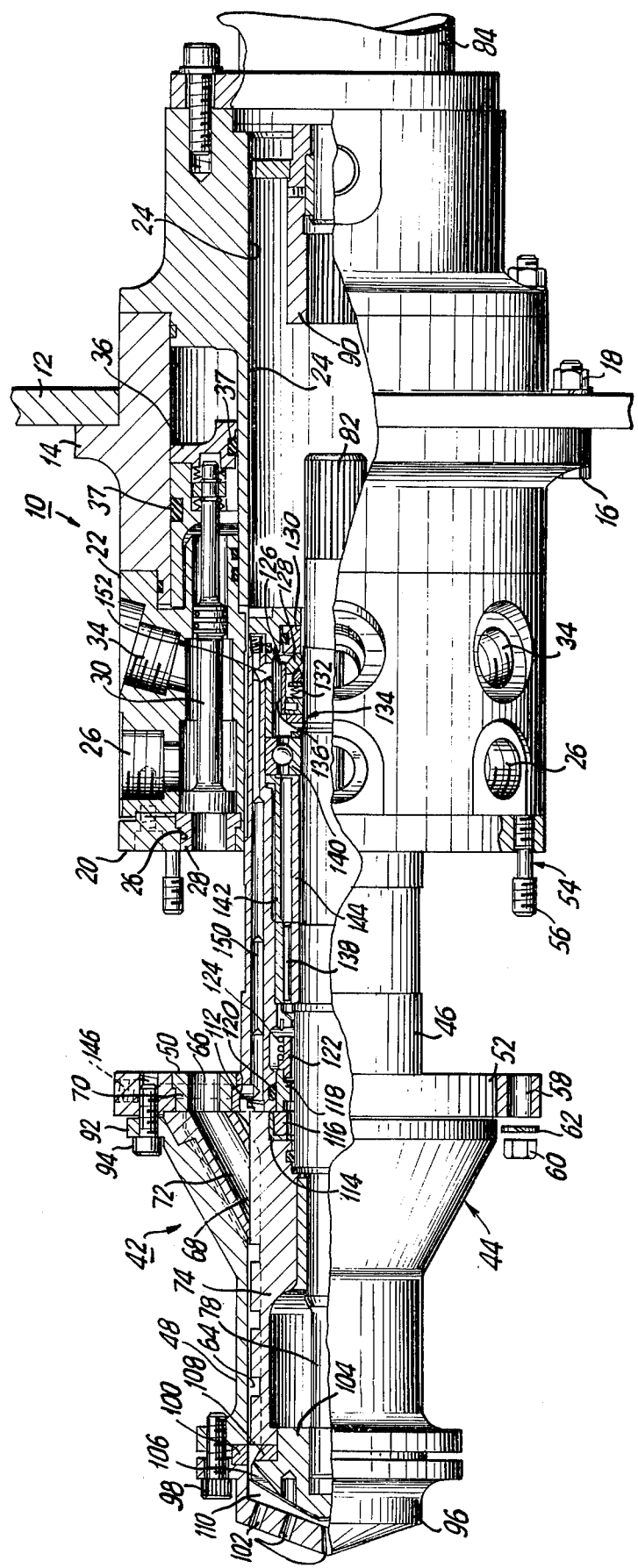
FIG. 2 shows the device of FIG. 1 with the cartridge in a condition where it is not completely connected with a stationary housing means.
Figure 3:
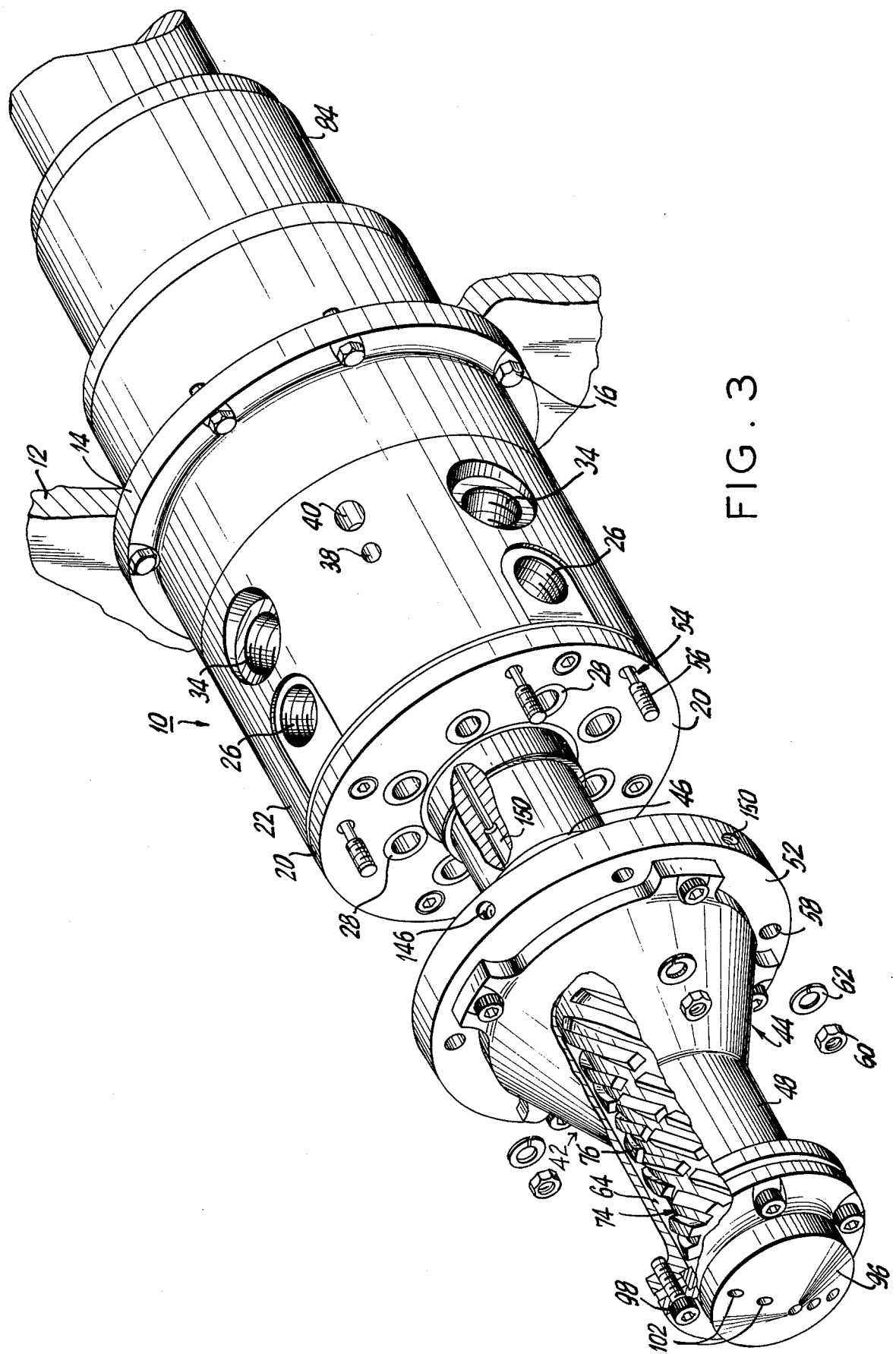
FIG. 3 is a partly exploded, perspective illustration of the device of FIGS. 1 and 2, with part of the structure of FIG. 3 being broken away to show interior features.

Referring first to FIGS. 1–3, there is illustrated therein a stationary housing means 10. This stationary housing means 10 is of an elongated tubular construction and extends through an opening in a supporting wall or plate 12 of an associated larger machine (not shown) for the continuous foaming and manufacture of foamed plastic insulation board. The stationary housing means 10 includes an outwardly directed flange 14 formed with a series of openings for receiving fastening bolts 16. The bolts 16 extend through openings of the mounting plate or wall 12 and are connected at the rear part thereof with nuts 18, so that in this way the stationary housing means 10 is fixedly mounted on the stationary support structure 12.

Forwardly of the mounting wall 12 the stationary housing means 10 has a valve seat stop plate or front end face 20 situated in a plane normal to the central axis of the elongated stationary housing means 10. The housing means 10 has an outer cylindrical surface 22 formed with an interior axial bore 24 extending rearwardly from the front end face 20 completely through the stationary housing means 10. This stationary housing means 10 is formed with a plurality of inlet ports 26 extending from the outer surface 22 to the front end face 20, the parts of these ports 26 which are situated at the surface 22 being internally threaded to receive suitable fittings for connecting tubular supply conduits to the several ports 26 which respectively receive the flowable components which are to be blended together. At the front end face 20 the housing means 10 carries a plurality of precisely machined sleeves 28 which act as valve seats for controlling the flow of material to the cartridge 42.

A plurality of spool valve means 30 are situated in suitable bores formed in the wall of the housing means 10 and are movable between the closed position indicated in FIG. 2, for closing the inlet ports 26, and the open position shown in FIG. 1 for opening the inlet ports 26, the valve means 30 being shown in phantom lines in its closed position in FIG. 1. Thus, in the closed position it will be seen that each of the valve means 30 has a valve head 32 fluid-tightly engaging a rear surface of the seat 28. In the open position shown in FIG. 1, these valve heads 32 engage a shoulder formed in the bores which accommodate the several valves 30, so that in this way the valve heads 32 of the several valve means 30 provide metal-to-metal seals.

Rearwardly of the inlet ports 26, the stationary housing means 10 is formed with a plurality of recirculating ports 34 which are respectively in axial alignment with the inlet ports 26 for communicating therewith when the plurality of valve means 30 are in the closed positions indicated in FIG. 2. Thus, in the closed positions of the valve means 30 shown in FIG. 2, when the flowable components delivered to the inlet ports 26 cannot flow to the outlet ends of the ports 26 at the front end face 20 of the housing means 10, these flowable components will flow instead to the recirculating ports 34 and returned to the several sources from which the flowable components are derived. It will be seen that for this purpose the ports 34 also are internally threaded so as to receive suitable fittings which in turn are connected to suitable tubular conduits for returning the components to their sources. In this way it is possible for the several flowable components which are to be blended together to be continuously delivered to the inlet ports 26 with these flowable components either flowing to the outlet ends of the ports 26 at the front end face 20 of the housing means 10, when the several valve means 30 are in the open positions thereof shown in solid lines in FIG. 1, or for returning through the recirculating ports 34 when the several valve means 30 are in their closed positions indicated in FIG. 2.

A valve-operating means 36 is operatively connected with the several valve means 30 for operating the same. The illustrated valve-opening means 36 takes the form of an annular piston or ring which is slidable in an interior space formed in the wall of the stationary housing means 10. Suitable 0 ring piston seals 37, 37 are provided to seal the inner and outer diameters of the piston 36 with the adjacent bores in said housing. The front and rear parts of the space which respectively communicate with the front and rear surfaces of the piston 36 respectively communicate with suitable passages through which air under pressure is delivered in order to displace the piston 36 either to the forward position shown in FIG. 2 for closing the valve means 30, or to the rear position shown in FIG. 1, for opening the valve means 30. Thus, when air under pressure is delivered to the front face of the piston 36, the space at the rear thereof is vented, while when air under pressure is delivered to the rear face of the piston 36 the space at the front thereof is vented. For this purpose the pneumatic air under pressure may be delivered either to port 38 or port 40 such as indicated in FIG. 3 to operate the piston 36. The ports 38 and 40 communicate through passageways (not shown) with the chambers on either side of the piston 36, so that with suitable supply and venting means it is possible to shift the piston 36 in order to displace the plurality of valve means 30 between their open and closed positions.

A cartridge 42 is illustrated in FIGS. 2 and 3 in a condition partly separated from the stationary housing means 10, while the cartridge 42 is shown in FIG. 1 operatively connected with the stationary housing means 10. The cartridge 42 includes a cartridge housing 44 having an elongated rear portion 46 which is received in the axial bore 24 of the stationary housing means 10. Forwardly of its rear portion 46 the cartridge 42 has an elongated front portion 48. At a junction between the front and rear portions 46 and 48, the cartridge housing 44 has a rearwardly directed annular surface 50 forming part of a flange 52 of the cartridge housing 44. The rearwardly directed surface 50 of the cartridge housing 44 is normally in fluid-tight engagement with the front end face 20 of the stationary housing means 10. A connecting means 54 is provided for releasably connecting the entire cartridge 42 with the stationary housing means 10. The connecting means 54 includes a plurality of threaded studs 56 which are threaded into suitable bores of the stationary housing means 10 and which extend through openings 58 of the flange 52 so as to receive nuts 60 and lock washers 62 for the purpose of releasably connecting the cartridge 42 with the stationary housing means 10, as is clearly apparent from FIGS. 1 and 2.

The elongated front portion 48 of the cartridge housing 44 defines in its hollow interior a mixing chamber 64 in which the various flowable components received from the inlets ports 26 are blended together while also being fed forwardly in a manner described below. The cartridge housing 44 is formed with a plurality of component-transmitting ports 66 which respectively communicate with the inlet ports 26 and which terminate in front outlet ends 68 at the rear portion of the mixing chamber 64. Thus, when the cartridge 42 is operatively connected with the stationary housing means 10, and when the plurality of valve means 30 are in their open positions shown in FIG. 1, the various flowable components will flow from the inlet ports 26 through the ports 66 to the outlet ends 68 of the latter from where these various components are received at the interior rear portion of the mixing chamber 64. The several component-transmitting ports 66 are aligned with rear sleeves 70 which respectively communicate fluid-tightly with the sleeves 28 in the position of the parts shown in FIG. 1, and these sleeves 70 communicate in turn with the inclined sleeves 72 which line the forward portions of the component-transmitting ports 66. Those skilled in the art will appreciate that sleeves or inserts 70 and 72 may be of varying internal diameter and act as orifices to proportion the rate of flow of constituents to the mixing chamber 64.

Situated within the mixing chamber 64 is a rotary impeller means 74 which serves to agitate and blend together the various flowable components received from the outlet ends 68 of the ports 66, this impeller means 74 also serving to feed the components forwardly while blending them together and agitating them. As is shown most clearly in FIG. 3, the rotary impeller means 74 is formed with a plurality of helical grooves which define between themselves the helically extending teeth 76 which are located closely adjacent to the inner surface of the front cartridge housing portion 48 as well as directly next to the front outlet ends 68 of the ports 66, and the direction of rotation of the rotary impeller means 74 is such that the teeth 76 serve to feed the blended components forwardly. It will be noted from FIG. 3 that the teeth of the rotary impeller means are circumferentially interrupted at a plurality of locations distributed axially along the rotary impeller means so that in this way the mixing and blending teeth are interrupted to increase the interior volume which will accommodate the flowable components while also contributing to the effectiveness of the mixing and blending operation.

For the purpose of rotating the rotary impeller means 74, the impeller means 74 is fixed with a rotary drive shaft means 78. Thus, the drive shaft means 78 is fixed to the rotary impeller means 74 as by a key 80, so that the rotation of the shaft 78 will be transmitted to the impeller 74. This rotary drive shaft means 78 extends completely through and outwardly beyond the rear end of the cartridge housing means 44 to terminate in a splined free end portion 82.

The rear end of the stationary housing means 10 carries a drive means 84 which in the illustrated example is in the form of a hydraulic motor having an inlet 86 for oil under pressure and an outlet 88 for the oil which has travelled through the hydraulic motor 84. These parts are shown in FIG. 1. The drive means 84 has a hollow output shaft 90 extending coaxially into the axial bore 24 of the stationary housing means 10. This hollow shaft 90 is formed with internal splines to cooperate with the external splines at the free end portion 82 of the drive shaft means 78. Thus, when the cartridge 42 is connected by the connecting means 54 to the stationary housing means 10, the splines connection between the shafts 82 and 90 will provide for a removable drive connection between the drive means 84 and the shaft 82. With this construction when the nuts 60 are removed it is a simple matter simply to displace the cartridge from the stationary housing means 10 in the manner indicated in FIG. 2. Of course, the valve means 30 is displaced to the closed position shown in FIG. 2 prior to removal of the cartridge 42, as pointed out above.

Although the front housing portion 48 of the cartridge 42 could be formed of one piece, in the illustrated example the front housing portion 48 has a rear portion which is of frustoconical configuration and which terminates in an outer flange 92 fixed by bolts 94 to the front flange 52 of the cartridge housing 44. Also, there is removably connected with the front housing portion 48 a front dispensing nozzle means 96. For this purpose, fastening bolts 98 are provided to hold the dispensing nozzle to the housing portion 48. A suitable ring 100 is situated between the dispensing nozzle means 96 and the front flange of the front housing portion 48. The dispensing nozzle means 96 includes a plurality of nozzle outlets 102 arranged in the manner shown most clearly in FIGS. 3 and 4.

At its front end, the rotary impeller means 74 includes a toothed nut 104. This toothed nut 104 is, for example, threaded into an opening at the front end of the impeller means 74 and also is formed with a central rearwardly directed recess receiving the front end portion of the drive shaft means 78. Thus nut 104 is formed at its front outer peripheral region with a plurality of radially extending slits 106, and these slits 106 define between themselves the teeth of the nut 104. Between the front end of the impeller 74 and the nut 104 there is a sealing ring 108 which has its periphery tapered as illustrated in FIGS. 1 and 2, so as to form a suitable transition region from the front of the impeller means 74 to the toothed nut 104 and dispensing nozzle means 96. The inner surface of the dispensing nozzle means 96 includes a radially extending groove 110 behind the row of five outlets 102 shown best in FIGS. 1, 2 and 4. In this way, the groove in cooperation with the teeth of the nut 104 provides a scouring action which serves to prevent undesirable build-up of any solidified or gelled materials in the front region of the mixing chamber 64 and at the same time provides additional mixing of the materials prior to exit from the outlets 102.

As is shown in FIGS. 1 and 2, the rotary impeller means 74 extends rearwardly from the front outlet ends 68 of the component-transmitting ports 66, and the impeller means 74 terminates in a rear annular end surface 112 which surrounds the shaft 78 while being spaced therefrom. At its inner peripheral portion, the rear end surface 112 of the impeller means 74 if formed with a circular notch receiving a gasket 114 which serves to seat a stellite ring 116 forming part of a front seal means of the cartridge 42. Thus, the elements 114 and 116 turn together with the impeller means 74. The front seal means includes a carbon ring 118 surrounded by a sealing ring 120. A collar 122 is pressed against the carbon ring 118 by a spring 124. Thus, these components 116, 118, 122 and 124 form a front seal means for sealing off the rear end surface 112 of the impeller means 74 from the remainder of the interior of the cartridge housing means 44.

In addition to this front seal means there is a rear seal means situated at the rear portion of the cartridge housing where the shaft 78 extends outwardly and rearwardly beyond the cartridge housing. The rear seal means 126 includes a circular sealing member 128 which is pressed against a ring 130 engaging an inwardly directed rear flange of the cartridge housing 44. For this purpose a plurality of springs 132 press against a ring which in turn acts through a tapered element on the sealing member 128, and a suitable snap ring and collar assembly 134 maintains the rear seal means 126 in the position shown in FIG. 2 surrounded by a wall 136 of the rear seal means.

In order to support the drive shaft means 78 for rotary movement, the rear portion 46 of the cartridge housing means 44 carries in its interior a front needle bearing 138 and a rear ball bearing 140 which together form a bearing means supporting the drive shaft means 78 for rotary movement in the cartridge housing 44. Outer and inner spacer sleeves 142 and 144 are spaced from each other and respectively extend between the outer and inner races of the bearings 138 and 140 so as to maintain these races spaced from each other. It will be noted that the interior space of the rear portion 46 of the housing 44 is not closed by the bearings 138 and 140. In other words, the space in which the front seal means is accommodated communicates through the bearing 138 and through the space between the spacer sleeves 142 and 144 as well as through the ball bearing 140 with the rear space in which the rear seal means 126 is accommodated.

The cartridge 42 is provided with a lubricant-circulating means for circulating lubricant through the interior of the rear portion 46 of the cartridge housing 44 so as to lubricate the bearing means 138, 140 as well as to achieve a cooling action. The lubricant-circulating means includes inlet and outlet passages 146 and 148 which are formed in the cartridge housing means 44 adjacent the rearwardly directed surface 50 thereof in the flange 52. These passages are also shown schematically in FIG. 6. The lubricant passages 146 and 148 communicate through suitable unillustrated tubes with a reservoir for the lubricant, a suitable pump, for example, being provided to pump the lubricant into the passage 146 and remove it from the passage 148. At its inner end the passage 146 communicates with an axial lubricant bore 150 which extends axially along the rear portion of the cartridge housing 44 and which has at its rear end an outlet opening 152 through which the lubricant is delivered into the space in which the rear seal means 126 is accommodated. From this space the lubricant is received in a second axial lubricant bore 154 which is identical with and diametrically opposed to the bore 150 and which communicates with the passage 148, so that in this way lubricant is circulated toward and away from the region of the rear seal means 126.

Figure 7:
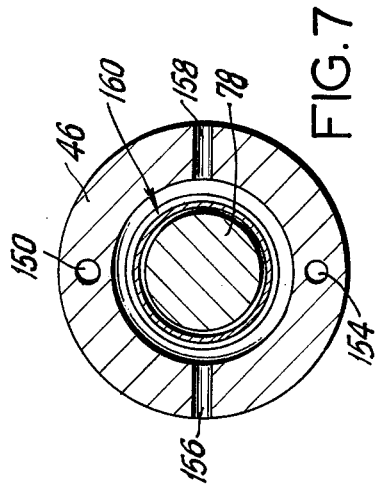
FIG. 7 is a schematic fragmentary transverse section taken along line 7—7 of FIG. 6 in the direction of the arrows for showing further details of the lubricant circulation path.

In addition, as is shown in FIG. 7, the flange 52 is formed with an additional lubricant inlet passage 156 and lubricant outlet passage 158 diametrically opposed to the passage 156, these passages 156 and 158 also communicating with a suitable source of lubricant which may be the same source as is used for the lubricant delivered to the passages 146 and 148, although the pressure of the lubricant flowing into the passage 156 and removed by the passage 158 is controlled independently of the pressure of the lubricant flowing through the inlet and outlet passages 146 and 148. Thus, the additional lubricant passages 156 and 158 communicate only with the interior portion of the housing 44 which is just to the rear of the impeller means and in which the front seal means 160 is accommodated. This front seal means 160 of course includes the components 116 and 118, as well as the spring 124 and collar 122, as described above.

With the above lubricant-circulating means of the invention a number of advantages are achieved. Thus, the lubricant in the spaces which accommodate the front seal means 160 and the rear seal means 126 also acts to apply pressure on the seals to augment the pressure provided by the springs 124 and 132. In addition, the circulation of the lubricant provides a highly desirable cooling action. Moreover, the lubricant received at a given pressure in the inlet passage 146 loses some of its pressure while flowing along the bore 150 due to friction losses as well as due to the reduction in diameter of the bore 150 apparent from the stepped construction thereof shown in FIGS. 1 and 2. Thus, the pressure of the lubricant in the space accommodating the rear seal means 126 is less than the pressure with which the lubricant is delivered to the passage 146. The outlet passage 148 communicates through a valve with the reservoir for the lubricant, and this valve is adjusted so that the amount of lubricant taken from the passage 148 is greater than the amount delivered by way of the inlet passage 146. On the other hand, the valve connected to the outlet passage 158 is adjusted so that the lubricant removed through the passage 158 is less than the amount delivered under pressure to the inlet passage 156 shown in FIG. 7. Thus, the pressure of the lubricant in the space accommodating the front seal means 160 is greater than the pressure of the lubricant in the space accommodating the rear seal means 126, and as a result some of the lubricant at the region of the front seal means 160 flows rearwardly through the needle bearing 138, through the space between the spacer sleeves 142 and 144, and through the ball bearing 140 to the space accommodating the rear seal means 126. It is this additional lubricant flowing rearwardly through the bearing means 138, 140, schematically indicated in FIG. 6, which is received in the bore 154 and flows out through the passage 148 to provide through the latter an amount of oil flow greater than that received in the inlet passage 146, and of course accounting for the lesser amount of lubricant removed through the outlet passage 158 as compared with the amount delivered to the inlet passage 156. Thus, there is continuous flow of lubricant rearwardly through the bearing means 138, 140 to provide an excellent lubrication as well as cooling action as pointed out above. It is furthermore to be noted that the axial lubricant bores 150 and 154 have open front ends situated directly at the rear surface 112 of the rotary impeller means so that there is also a film of lubricant between the rotating rear surface 112 of the impeller means and the stationary front surface of the flange 52, this film also becoming situated between the rings 116 and 118 to increase the operating life of the front seal means as well as to cool and effectively lubricate the front seal means.

Figure 5:
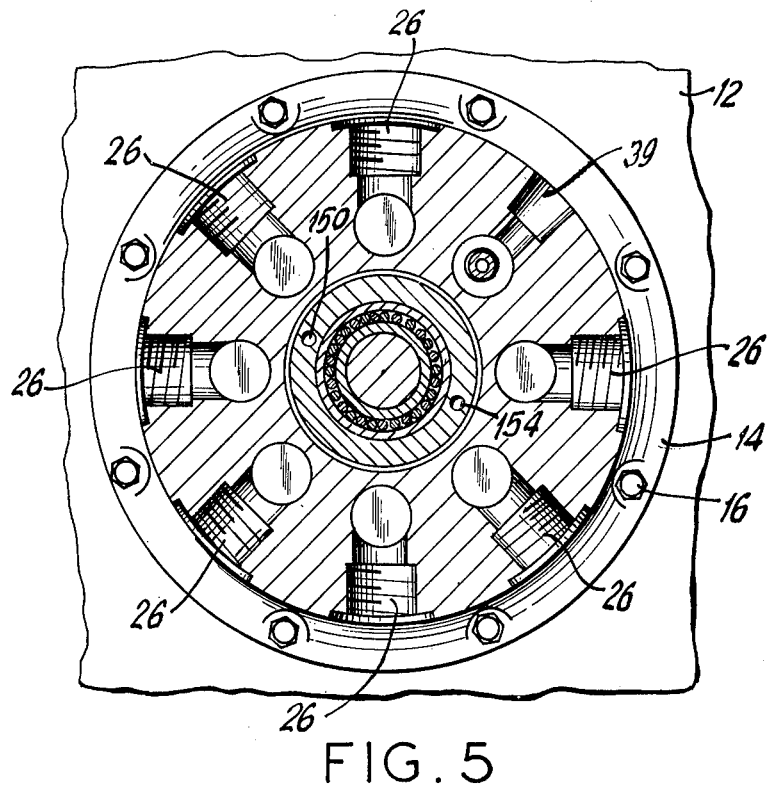
FIG. 5 is a transverse section of the device of FIG. 1 taken along line 5—5 of FIG. 1 in the direction of the arrows.

As has been indicated above, the structure of the invention is particularly suitable for blending together components of a phenolic foam material, this material being ejected through the front dispensing nozzle outlets 102 onto and underlying moving platen for subsequent foaming into building insulation board. As is apparent from FIG. 5, in the illustrated example there are seven inlet ports 26 and associated piston valves 30. Typically, these inlet ports will be used collectively to deliver the several phenolic components in a ratio of, approximately, resin 66%, catalysts 6.6%, blowing agent 4.5%, plasticizers and fire retardants 19.6%, and surfactant 3.3%. The eighth inlet port 39 shown in cross-section in FIG. 5 is provided for use as a water or solvent passage for flushing of the mixing chamber.

As has been pointed out above, with the structure of the invention it is possible to achieve an extremely fast production rate wherein typically the "creaming" time of the mixed chemical components is 2–3 seconds while the subsequent blowing is completed in the following 20–30 seconds.

One of the outstanding features of the invention resides in the fact that the entire cartridge 42 is removable while the stationary housing means 10 has only the inlet ports 26 and the recirculating ports 34 as well as the valves 30. These latter components of the stationary housing means are contacted only by unmixed and readily flowable components so that no difficulty due to chemical reaction is encountered at this part of the structure. The removable cartridge means 42 contains all components of the assembly that are in contact with the mixed chemical components of the foamable plastic. Of course, a long operating life is assured because of the effectiveness of the front and rear seals as well as the cooling and lubrication achieved with the lubricant-circulating system. Also, the scouring action provided between the front nut and nozzle greatly reduces the tendency of undesirable build-up of solidifying or gelled materials. Thus, a long operating life is assured for the structure of the invention. At the same time, if it becomes necessary to interrupt the operations, it is a simple matter simply to close the valves and remove the entire cartridge 42, quickly replacing the latter with another cartridge 42 which is maintained in readiness for this purpose, and thus the operations can quickly be continued if an interruption is necessary. In the meantime, while these operations are continued, the removed cartridge 42 can easily be disassembled, cleaned, repaired, and reassembled so as to be ready for further use.

Figure 6:
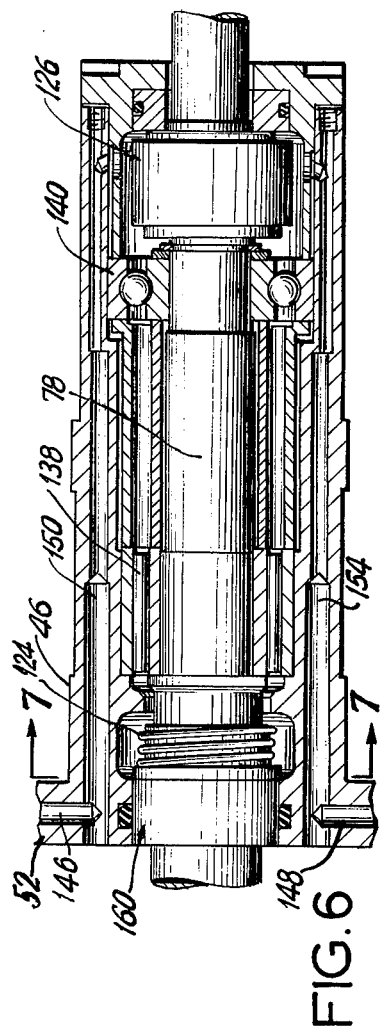
FIG. 6 is a fragmentary longitudinal elevation, partly in section, diagrammatically illustrating part of the bearing lubrication oil circuit.
Figure 4:
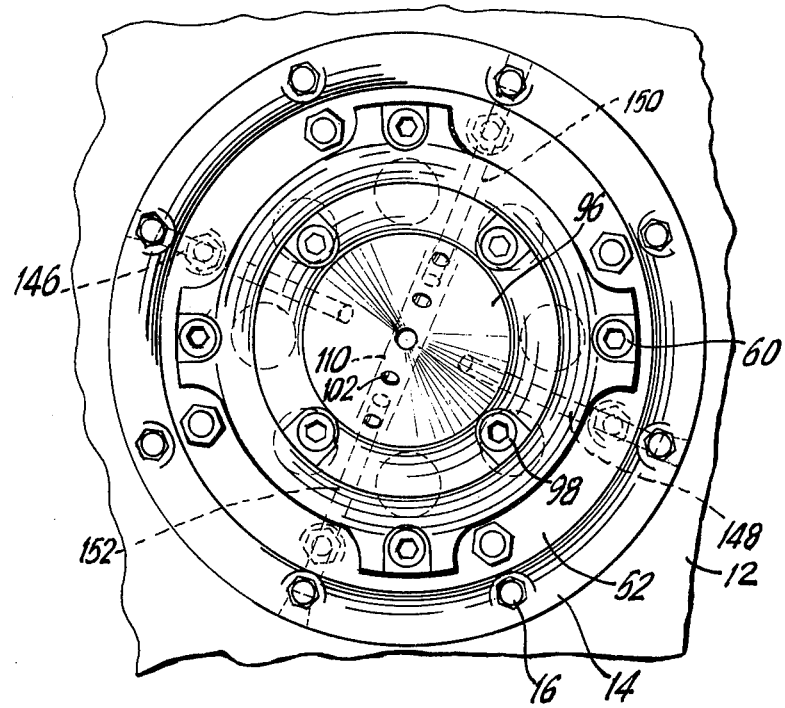
FIG. 4 is a front end elevation of the device of FIG. 1 as seen from the left of FIG. 1.

It is to be noted that while all of the passages 146, 148, 150 and 152 appear to be in a common plane in FIG. 4, the passages 150 and 152 which communicate only with the space accommodating the front seal means 160 are inclined toward the rear so as to have their outlet ends situated at the space which accommodates the front seal means 160 in the manner apparent from a comparsion of FIGS. 6 and 7.

WHAT IS CLAIMED IS:

1. In a device for blending flowable components together to form a plastic therefrom, stationary housing means having a front end face and formed with an axial bore extending rearwardly along the interior of said stationary housing means from said front end face thereof, said stationary housing means having an outer surface and being formed outwardly of said axial bore with a plurality of inlet ports each extending from said outer surface of said stationary housing means to said front end face thereof for respectively receiving components to be blended together and for delivering the components to the front end face of said stationary housing means, a cartridge removably connected with said stationary housing means, said cartridge having an elongated tubular cartridge housing means having a rear portion extending into said axial bore of said stationary housing means, an elongated front portion extending forwardly from said stationary housing means, and at a junction between said rear and front portions an annular rearwardly directed surface fluid-tightly engaging said front end face of said stationary housing means, said front portion of said cartridge housing means having a hollow interior defining a mixing chamber and said cartridge housing means being formed with a plurality of component-transmitting ports respectively communicating with said inlet ports of said stationary housing means at said front end face thereof and each extending from said rearwardly directed surface of said cartridge housing means to said mixing chamber where said component-transmitting ports terminate in front outlet ends, so that said component-transmitting ports transmit the components from said inlet ports of said stationary housing means to said mixing chamber, connecting means releasably connecting said cartridge housing means to said stationary housing means with said rearwardly directed surface of said cartridge housing means fluid-tightly engaging said front end face of said stationary housing means, rotary impeller means situated in said mixing chamber of said cartridge housing means closely adjacent to said front outlet ends of said component-transmitting ports for agitating and blending together as well as feeding forwardly the components received in said mixing chamber from said component-transmitting ports of said cartridge housing means, rotary drive shaft means fixed to said impeller means and extending therefrom rearwardly along and through said rear portion of said cartridge housing means and beyond the latter along said axial bore of said stationary housing means, drive means carried by a rear portion of said stationary housing means and releasably connected with said drive shaft means at a portion thereof which extends rearwardly beyond said cartridge housing means for driving said drive shaft means when said cartridge housing means is connected by said connecting means with said stationary housing means, said rotary impeller means having a rear end surface surrounding said drive shaft and situated rearwardly of said front outlet ends of said component-transmitting ports of said cartridge housing means, sealing means carried by said cartridge housing means and having a fluid-tight sealing engagement with said rear end surface of said rotary impeller means for sealing off from said impeller means and mixing chamber the interior of said cartridge housing means which is situated to the rear of said impeller means, and dispensing nozzle means carried by said cartridge housing means at a front end of said front portion thereof for dispensing the blended components from said mixing chamber, whereby said cartridge housing means may be removed from said stationary housing means together with said drive shaft means, said impeller means connected thereto, said dispensing nozzle means, and said sealing means.

2. The combination of claim 1 and wherein said impeller means has a front end carrying a toothed nut means for preventing build-up of material in said mixing chamber means at the region of said dispensing nozzle means.

3. The combination of claim 2 and wherein said front dispensing nozzle of said cartridge housing means fixedly carries at an inner surface thereof a plurality of rearwardly extending fins cooperating with the toothed nut means at the front end of said rotary impeller means for preventing build-up of matter in the region of the dispensing nozzle means.

4. The combination of claim 1 and wherein said stationary housing means carries a plurality of valve means which are respectively movable between closed positions closing said inlet ports and open positions opening said inlet ports, and valve-operating means operatively connected with said plurality of valve means for simultaneously displacing the latter to said closed positions thereof when the cartridge housing means is to be removed from said stationary housing means.

5. The combination of claim 4 and wherein said stationary housing means is formed with recirculating ports communicating with said inlet ports only when said plurality of valve means are in their closed positions for recirculating components from said inlet ports back toward the sources for said components.

6. The combination of claim 4 and wherein said plurality of valve means respectively include metal valve heads and said stationary housing means having metal seats fluid-tightly engages by said metal valve heads when said plurality of valve means are in their open positions opening said inlet ports, so that a metal-to-metal seal is provided by said plurality of valve means during flow of the components through said inlet ports toward said component-transmitting ports of said cartridge housing means.

7. The combination of claim 4 and wherein said valve-operating means includes a piston slidable in said stationary housing means and operatively connected with said plurality of valve means, and means for directing a fluid under pressure with respect to said piston for displacing said plurality of valve means between said open and closed positions thereof.

8. The combination of claim 1 and wherein said drive shaft means has beyond said cartridge housing means in said axial bore of said stationary housing means a splined free end while said drive means has a splined portion cooperating with said splined free end of said drive shaft means to provide the removable driving connection therewith.

9. The combination of claim 1 and wherein said rear portion of said cartridge housing means carries a bearing means cooperating with said drive shaft means to support the latter for rotary movement.

10. The combination of claim 9 and wherein said sealing means which cooperates with the rear end surface of said rotary impeller means forms a front sealing means rear sealing means situated in said rear portion of said cartridge housing means and forming a rear seal for the latter surrounding said drive shaft means at a region where the latter extends outwardly and rearwardly beyond said cartridge housing means, and lubricant-circulating means carried by said cartridge housing means for circulating lubricant between said front and rear seal means.

11. The combination of claim 10 and wherein said rear portion of said cartridge housing means defines in its interior a space which surrounds said drive shaft means and said bearing means being situated in said space with the parts of said space situated forwardly and rearwardly of said bearing means communicating with each other through said bearing means, and said lubricant-circulating means providing at said rear seal means a pressure less than at said front seal means so that lubricant will progress through said space from seal means toward said rear seal means for cooling as well as lubricating said drive shaft means and bearing means.

12. The combination of claim 11 and wherein said front and rear seal means include sealing components and springs urging the latter respectively into a sealing position, and said lubricant-circulating means augmenting the force of said spring means with the lubricant pressure.

13. The combination of claim 11 and wherein said lubricant-circulating means includes a pair of diametrically opposed axially extending lubricant bores formed in a wall of said rear portion of said cartridge housing means, and a pair of front inlet and outlet passages formed in said cartridge housing means adjacent said rearwardly directed surface thereof and communicating with said lubricant bores for respectively feeding lubricant to one and receiving lubricant from the other of said lubricant bores, both of said lubricant bores respectively communicating at rear portions thereof with a space in which said rear sealing means is accomodated.

14. The combination of claim 13 and wherein said cartridge housing means is formed with a pair of diametrically opposed additional passages adjacent said rearwardly directed surface for respectively feeding lubricant into and out of said cartridge housing means, said additional passages communicating only with a space within said cartridge housing means where said front seal means is accommodated.

15. The combination of claim 1 and wherein said rotary impeller means has an outer surface formed with helically extending teeth cooperating with an inner surface of said forward portion of said cartridge housing means for blending and agitating as well as feeding forwardly the components received in said mixing chamber.

16. The combination of claim 15 and wherein said helically extending teeth of said impeller means are formed with circumferentially extending interruptions.

* * * * *